US009582262B2

(12) United States Patent
Dhar et al.

(10) Patent No.: US 9,582,262 B2
(45) Date of Patent: Feb. 28, 2017

(54) SYSTEMS AND METHODS FOR INSTALLING UPGRADED SOFTWARE ON ELECTRONIC DEVICES

(71) Applicants: Abhishek Dhar, Kolkata (IN); Swarup Mandal, Kolkata (IN); Debasish Chanda, Kolkata (IN)

(72) Inventors: Abhishek Dhar, Kolkata (IN); Swarup Mandal, Kolkata (IN); Debasish Chanda, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 206 days.

(21) Appl. No.: 14/457,617

(22) Filed: Aug. 12, 2014

(65) Prior Publication Data

US 2015/0363187 A1 Dec. 17, 2015

(30) Foreign Application Priority Data

Jun. 16, 2014 (IN) .......................... 2909/CHE/2014

(51) Int. Cl.
*G06F 9/44* (2006.01)
*G06F 9/445* (2006.01)
(Continued)

(52) U.S. Cl.
CPC ............. *G06F 8/65* (2013.01); *G06F 8/665* (2013.01); *G06F 8/67* (2013.01); *G06F 21/572* (2013.01); *G06F 21/64* (2013.01)

(58) Field of Classification Search
None
See application file for complete search history.

(56) References Cited

U.S. PATENT DOCUMENTS

| 5,647,986 A | 7/1997 | Nawathe et al. |
| 5,666,293 A | 9/1997 | Metz et al. |

(Continued)

FOREIGN PATENT DOCUMENTS

| DE | 197 52 615 C1 | 4/1999 |
| DE | 19752165 | 5/1999 |
| WO | WO 00/52570 | 9/2000 |

OTHER PUBLICATIONS

International Search Report mailed Aug. 21, 2015, for European Patent Application No. 15153852 (7 pages).

(Continued)

*Primary Examiner* — Paul Yanchus, III
(74) *Attorney, Agent, or Firm* — Finnegan, Henderson, Farabow, Garrett & Dunner, LLP

(57) ABSTRACT

Systems, methods, and computer-readable media for upgrading electronic devices are provided. An exemplary method executed by a hardware processor may comprise providing a management agent on an electronic device for communicating with one or more device drivers associated with the electronic device. The management agent may be installed, for example, using a downloaded upgrade package. The method may further comprise upgrading the one or more device drivers to enable a direct connection between the management agent and the one or more device drivers. This direct connection, in some embodiments, may enable the management agent to access, using the one or more device drivers, persistent storage associated with the electronic device. The method may further comprise providing a new boot loader to the management agent, and overwriting, by the management agent, an existing boot loader in the persistent storage with the received new boot loader, using the one or more device drivers.

20 Claims, 9 Drawing Sheets

(51) Int. Cl.
*G06F 21/64* (2013.01)
*G06F 21/57* (2013.01)

(56) References Cited

U.S. PATENT DOCUMENTS

| | | | |
|---|---|---|---|
| 6,345,370 B1 * | 2/2002 | Kwon | G06F 11/2221 |
| | | | 714/44 |
| 6,591,376 B1 | 7/2003 | VanRooven et al. | |
| 6,615,404 B1 | 9/2003 | Garfunkel et al. | |
| 6,892,297 B1 * | 5/2005 | Aguilar | G06F 8/65 |
| | | | 713/1 |
| 8,725,995 B1 * | 5/2014 | Kim | G06F 11/30 |
| | | | 709/222 |
| 2006/0259902 A1 * | 11/2006 | Lin | G06F 8/65 |
| | | | 717/168 |

OTHER PUBLICATIONS

"Systems Firmware Update Method before Rebooting the Operating System", Disclosed by International Business Machines Corporation, vol. 42, No. 425, Sep. 1, 1999 (2 pages).
Replacement European Search Report mailed Feb. 8, 2016, for counterpart European Patent Application No. 15 15 3852.

* cited by examiner

SYSTEMS AND METHODS FOR INSTALLING UPGRADED SOFTWARE ON ELECTRONIC DEVICES

BRIEF DESCRIPTION

Field

The present disclosure is generally directed to the field of upgrading electronic devices and, more specifically, to enabling an electronic device to receive a new boot loader and/or operating system.

Background

Embedded systems may utilize an Operating System (OS) to enable functionality such as wireless communication, satellite navigation, media playback (e.g., music/video), gaming, Bluetooth communication, voice recognition, and other features. These devices may also store applications that work with whatever OS is installed to enable further functionality.

The OS that is installed on these electronic devices typically does not change throughout the lifecycle of these devices. For example, if a user purchases a car with a GPS device that runs an OS, such as Wind River Systems' VxWorks or Microsoft's Windows Embedded Compact, the GPS device may be configured to prevent any other OS from being installed on the device. For example, the device may be configured with hardware that prevents installation of an arbitrary OS, thus preventing, for example, removing Windows Embedded Compact from the device and installing VxWorks. Manufacturers may implement these systems under the guise of security, for example, to prevent malicious code execution, but they can act as an impediment to full enjoyment of such devices if the OS installed on the device is no longer supported, stops working, or otherwise prevents the user from utilizing the device. Regardless, at best, the installed OS may be upgradable to a newer version of the same OS.

This can be problematic because it acts as a form of planned obsolescence. When the manufacturer of the OS stops providing updates, the device may become vulnerable to subsequent security exploits. The device may even stop functioning if, for example, the device depends upon a remote device that no longer operates.

Even when electronic devices are not technologically prevented from being upgraded, typical upgrade paths require that the user of the electronic device send the device to the manufacturer or leave it at a service center for installation of the upgraded OS. This, too, deprives the user from full enjoyment of the device. If the electronic device is installed in a vehicle (for example, if the device is a GPS or infotainment device), bringing the vehicle to a service center to have the device upgraded means the user may also lose the use of his primary mode of transportation for some time.

Embodiments of the disclosure may solve these problems as well as others.

BRIEF SUMMARY

Disclosed embodiments include systems, methods, and computer-readable media for enabling upgrade of electronic devices. For example, an exemplary method implemented at least in part on a hardware processor is described. The method may comprise providing a management agent on an electronic device for communicating with one or more device drivers associated with the electronic device. The management agent may be installed, for example, using a downloaded upgrade package. The method may further comprise upgrading the one or more device drivers to enable a direct connection between the management agent and the one or more device drivers. This direct connection, in some embodiments, enables the management agent to access, using the one or more device drivers, persistent storage associated with the electronic device. The method further comprises providing a new boot loader to the management agent, and overwriting, by the management agent, an existing boot loader in the persistent storage with the received new boot loader, using the one or more device drivers.

An exemplary system is also provided. The system may comprise at least one hardware processor and storage comprising instructions. The instructions are configured such that, when executed by the at least one hardware processor, they cause the hardware processor to perform operations consistent with disclosed embodiments.

An exemplary non-transitory computer-readable medium is also described. The medium comprises instructions that, when executed by the at least one hardware processor, cause the at least one hardware processor to perform operations consistent with disclosed embodiments.

Additional objects and advantages of the embodiments may be obvious from the description or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the embodiments as claimed.

BRIEF DESCRIPTION OF THE DRAWINGS

The accompanying drawings, which are incorporated in and constitute a part of this specification, illustrate various embodiments and together with the description, serve to explain the principles of the embodiments. In the drawings.

DESCRIPTION OF THE EMBODIMENTS

Reference will now be made in detail to exemplary embodiments, examples of which are illustrated in the accompanying drawings. Wherever convenient, the same reference numbers will be used throughout the drawings to refer to the same or like parts.

Embodiments of the present disclosure relate to enabling an electronic device to receive a new boot loader and/or operating system. Such electronic devices comprise, for example, wireless communication devices such as smartphones, wired communication devices, smart watches, in-vehicle infotainment systems having navigation or other capabilities, media players, office equipment, or the like. In some embodiments, a new boot loader is installed on the electronic device to enable the electronic device to receive a new operating system associated with the new boot loader. The new operating system, in some embodiments, cannot be loaded or initiated by the existing boot loader, but can be loaded or initiated by the new boot loader.

Figure 1:
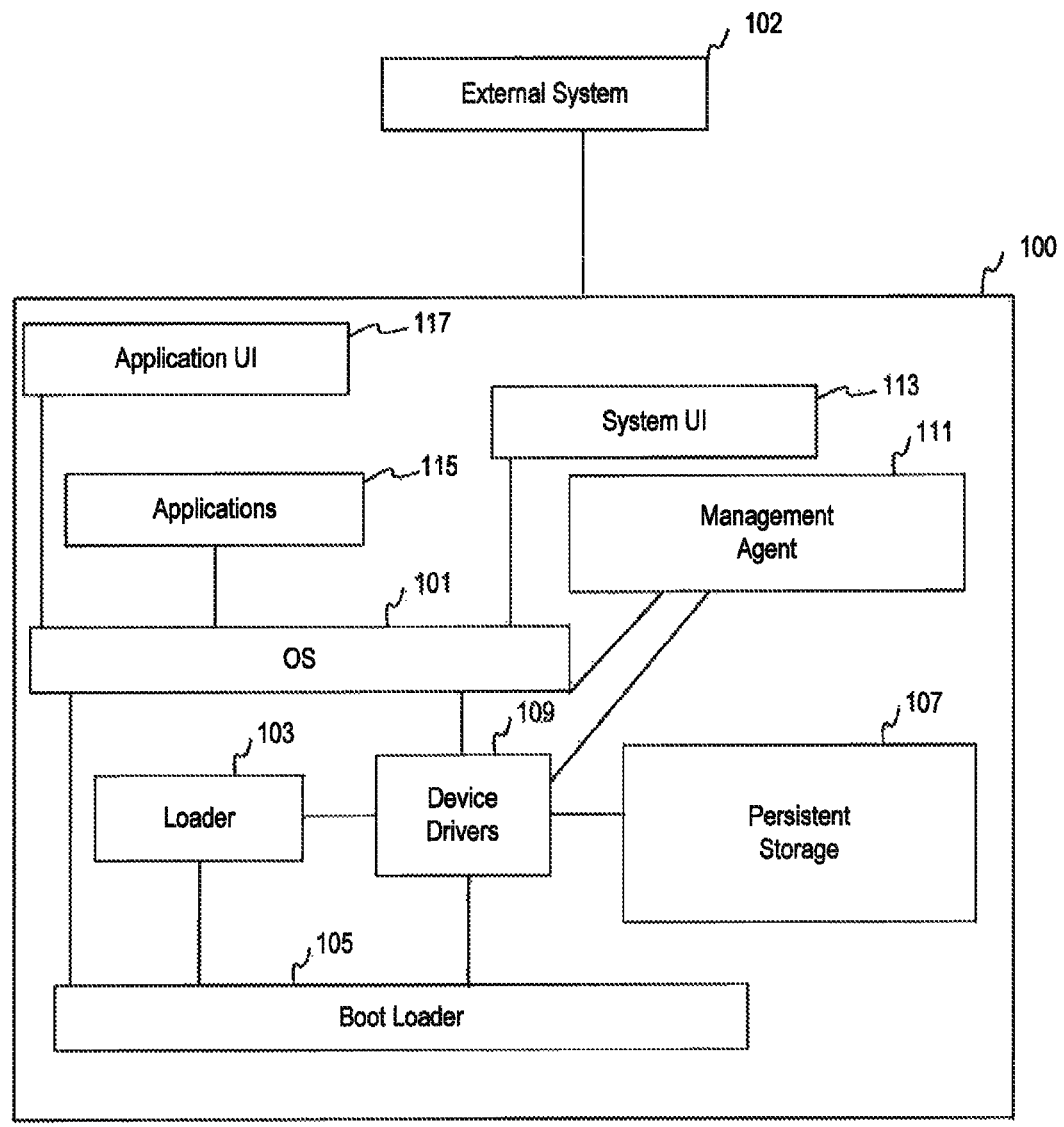
FIG. 1 illustrates an example electronic device for use with the disclosed methods and systems, consistent with the disclosed embodiments.

FIG. 1 illustrates an exemplary electronic device 100 for use with the disclosed methods and systems, consistent with the disclosed embodiments. Each of the components illustrated as part of electronic device 100 may be implemented in hardware, software, firmware, or some combination thereof. Electronic device 100 may comprise an OS (Operating System) 101, a Loader 103, a Boot Loader 105, a Persistent Storage 107, a set of Device Drivers 109, a Management Agent 111, a System UI 113, one or more Applications 115, and Application UI 117. FIG. 1 also depicts external system 102, which in some embodiments is a separate device from electronic device 100. In accordance with some embodiments, any of these components may be duplicated, combined with one or more other components, modified, or omitted. In some embodiments, external device 102 provides upgrades or other data to electronic device 100 over a wireless connection, a wired connection, or provides upgrades or other data to a removable storage device (like a USB drive) for connection with electronic device 100.

OS 101, in some embodiments, may be implemented as one or more sets of instructions operable to enable different components in electronic device 100 to communicate with one another. For example, in one embodiment, hardware components (such as persistent storage 107) may communicate with applications 115 using OS 101. OS 101 may also enable a user to interact with electronic device 100 by presenting a user interface operable to receive input (e.g., from a keyboard or touchscreen) and generate output (e.g., by displaying text or graphics on a screen, outputting sound, or generating printed matter). In some embodiments, OS 101 may be stored on persistent storage 107.

Examples of OS 101 include, for example, Wind River Systems' VxWorks, Microsoft's Windows Embedded Compact, Google's Android, Apple's iOS, or the like. While these example operating systems may all be understood as mobile or embedded operating systems, the embodiments are not limited to using only those types of operating systems, and those of skill will understand that other operating systems are possible as well.

Loader 103, in some embodiments, may be implemented as a program that enables the loading into memory and execution of an operating system or other program stored on a device, such as persistent storage 107. For example, loader 103 may comprise an operating system or other functionality that enables a new operating system to be loaded from persistent storage 107 and executed on electronic device 100. In other embodiments, loader 103 may receive a new operating system from a storage device connected to electronic device 100, a remote device such as a server, or over a network such as the Internet.

Boot Loader 105, in some embodiments, may be implemented as a program that enables access to persistent storage 107, retrieves data from persistent storage 107, and/or loads the data into memory for execution. For example, boot loader 105 may read OS 101 from persistent storage 107, determine whether OS 101 is valid (e.g., using a checksum), load OS 101 into memory (e.g., Random Access Memory), and cause electronic device 100 to reboot. Electronic device 100 may also then read OS 101 from memory and load OS 101. In some embodiments, boot loader 105 may be stored on persistent storage 107.

Persistent Storage 107, in some embodiments, may be implemented as a device for storing data. For example, persistent storage 107 may be implemented as a hard disk, flash memory, etc. Persistent storage 107, in some embodiments, is accessible only to certain components of electronic device 100, such as device drivers 109. In some embodiments, other components may access persistent storage 107 but only through device drivers 109. Moreover, persistent storage 107 may have a user-mode file system by which users using OS 101 modify the data stored on persistent storage 107. The file system may prevent the raw data on persistent storage 107 from being accessed by one or more components in electronic device 100.

Device Drivers 109, in some embodiments, may be implemented as software that controls hardware components of electronic device 100. For example, device drivers 109 may be configured to access persistent storage 107, and may enable other components (such as OS 101) to access persistent storage 107 by communicating with device drivers 109. In some embodiments, device drivers 109 may be implemented as part of OS 101.

In some embodiments, device drivers 109 may also be implemented to communicate with management agent 111 to enable management agent 111 to access persistent storage 107. In these embodiments, device drivers 109 may implement point-to-point communication protocols that serve to transmit data between management agent 111 and device drivers 109, such as by using 'IOCtl' system calls ("Input/Output Control"), Inter-Process Communication (IPC) protocols such as Message Queue, or the like.

Device drivers 109 may also prevent access to persistent storage 107 without appropriate authorization. For example, device drivers 109 may implement a process for "handshaking" which authenticates other components (such as management agent 111) before accepting instructions from those components to modify or access data stored on persistent storage 107.

Management Agent 111, in some embodiments, may be implemented as software that communicates with OS 101 and device drivers 109. Management agent 111 can be configured to communicate with OS 101 to upgrade device drivers 109. The upgrades may enable device drivers 109 to provide new functionality, including receiving instructions from management agent 111, performing a handshaking process with management agent 111, and/or reading/writing data on persistent storage 107.

In some embodiments, management agent 111 may also be implemented to access persistent storage 107 by communicating with device drivers 109. In these embodiments, management agent 111 may implement point-to-point communication protocols that serve to transmit data between management agent 111 and device drivers 109, such as by using 'IOCtl' system calls ("input/output control"), Inter-Process Communication (IPC) protocols such as Message Queue, or the like.

System UI 113, in some embodiments, comprises one or more programs and/or hardware that enable interaction between hardware components and software components in electronic device 100. For example, peripheral devices such as USB ports, disc drives, touchscreens, or the like, may be in operative communication with system UI 113, and system UI 113 may process input from these devices and send it to OS 101 or other components.

Applications 115, in some embodiments, comprise one or more programs for use with electronic device 100 that enable functionality such as media playback, navigation (e.g., using GPS), or voice communication (e.g., using Bluetooth functionality to connect to a cellular phone).

Application UI 117, in some embodiments, may be implemented as software that presents an interface to a user using electronic device 100. For example, application UI 117 may be configured to enable a user to interact with electronic device 100, for example, using voice recognition or touch recognition (e.g., by receiving presses on physical buttons or a touchscreen).

Figure 2A:
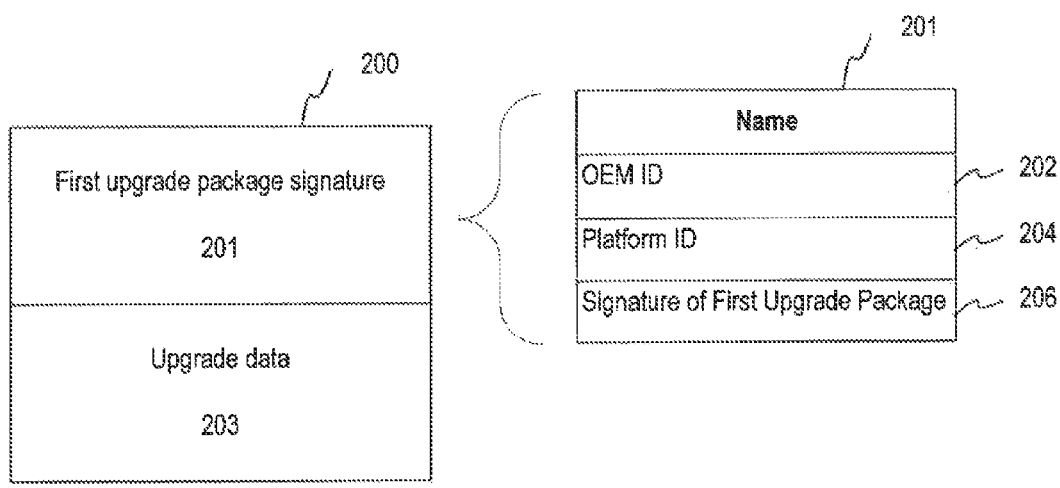
FIG. 2A illustrates an example first upgrade package, consistent with the disclosed embodiments.

FIG. 2A illustrates an example first upgrade package 200, consistent with the disclosed embodiments. In some embodiments, first upgrade package 200 contains first upgrade package signature 201 and upgrade data 203. Upgrade data 203, in some embodiments, may comprise data usable by electronic device 100 to upgrade device drivers 109, enabling device drivers 109 to communicate with management agent 111, etc. Upgrade data 203 may be in the form of, for example, an upgraded version of OS 101 that enables this communication. Upgrade data 203 may also comprise data usable to upgrade device drivers 109 without also upgrading OS 101. In some embodiments, upgrade data 203 can also comprise management agent 111.

First upgrade package 200 may be delivered to electronic device 100 through a variety of means. For example, electronic device 100 may receive first upgrade package 200 over a network (e.g., a wireless or wired network), via a direct connection with a device such as external device 102 (via, e.g., a USB connection), or from a storage device (such as a USB storage device or memory card).

First upgrade package signature 201 may comprise Original Equipment Manufacturer (OEM) ID 202. In some embodiments, OEM ID may be a 128 bit value identifying the original manufacturer of electronic device 100. First upgrade package signature 201 may also comprise Platform ID 204. In some embodiments, Platform ID 204 may be a 128 bit value identifying electronic device 100. This could be, for example, a unique identifier for electronic device 100 (such as a serial number), a non-unique identifier for electronic device 100 (such as a model number), and/or another identifier related to electronic device 100 (such as a Vehicle Identification Number associated with a vehicle in which electronic device 100 is installed).

First upgrade package signature 201 may also comprise upgrade package software signature 206. Upgrade package software signature 206, in some embodiments, may represent a hash value (e.g., an MD5 hash) corresponding to upgrade data 203. In other embodiments, upgrade package software signature 206 may comprise a hash of OS 101 on electronic device 100.

Figure 2B:
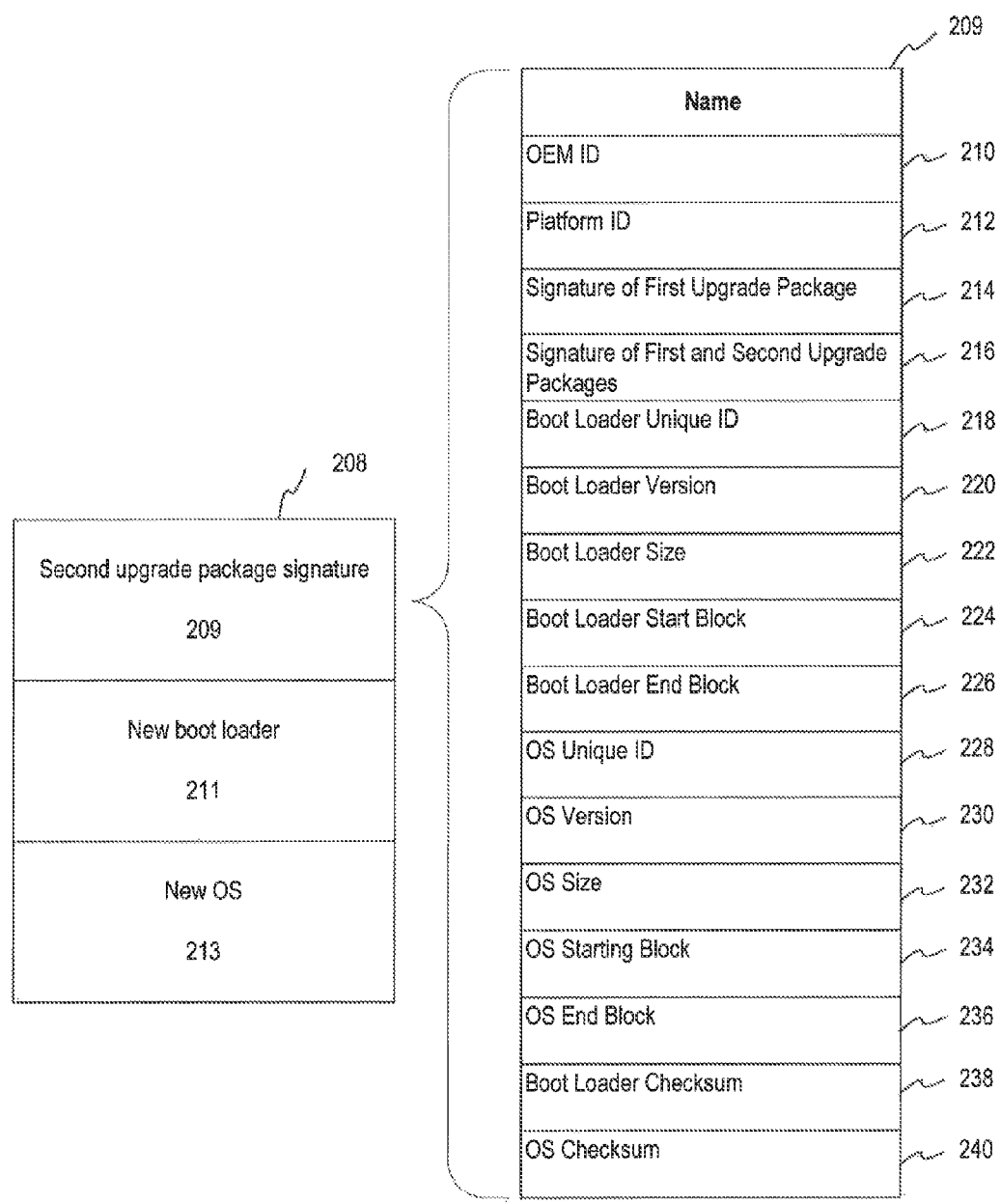
FIG. 2B illustrates an example second upgrade package, consistent with the disclosed embodiments.

FIG. 2B illustrates an example second upgrade package 208, consistent with the disclosed embodiments. In some embodiments, second upgrade package 208 may contain second upgrade package signature 209, new boot loader 211, and new OS 213. New boot loader 211, in some embodiments, comprises a different boot loader from boot loader 105 installed on electronic device 100. New boot loader 211 may differ in that is it of a different type, was produced by a different manufacturer than boot loader 105 was, or is a newer version of boot loader 105. In some embodiments, new boot loader 211 may be configured to enable electronic device 100 to boot new OS 213, whereas boot loader 105 (currently installed on electronic device 100) would not be able to boot new OS 213 due to security restrictions or another technical reason.

New OS 213, in some embodiments, comprises a different OS from OS 101 installed on electronic device 100. New OS 213 may differ in that is it of a different type, was produced by a different manufacturer than OS 101 was, or is a newer version of OS 101. In some embodiments, new OS 213 may be configured such that only new boot loader 211 is able to boot new OS 213. It is to be understood that new OS 213 may be optional and not necessarily included in all embodiments of second upgrade package 208.

Second upgrade package 208 may be delivered to electronic device 100 through a variety of means. For example, electronic device 100 may receive second upgrade package 208 over a network (e.g., a wireless or wired network), over a connection with a device such as external device 102 (e.g., via a USB connection), or from a storage device (such as a memory card).

Second upgrade package signature 209 may comprise OEM ID 210. In some embodiments, OEM ID may be a 128 bit value identifying the original manufacturer of electronic device 100. Second upgrade package signature 209 may also comprise Platform ID 212. In some embodiments, Platform ID 212 may be a 128 bit value identifying electronic device 100. This could be, for example, a unique identifier for electronic device 100 (such as a serial number), a non-unique identifier for electronic device 100 (such as a model number), and/or another identifier related to electronic device 100 (such as a Vehicle Identification Number associated with a vehicle in which electronic device 100 is installed).

Second upgrade package signature 209 may also comprise upgrade package software signature 214. Upgrade package software signature 214, in some embodiments, represents a hash value (e.g., an MD5 hash) corresponding to upgrade data 203 from first upgrade package signature 201 (in FIG. 2A). In other embodiments, upgrade package software signature 214 may comprise a hash of OS 101 on electronic device 100. In some embodiments, upgrade package software signatures 214 and 206 can be used by electronic device 100 to ensure that each package (e.g., first upgrade package 200 and second upgrade package 208) is authorized to be installed on electronic device 100.

Second upgrade package signature 209 may also comprise second upgrade package software signature 216. Second upgrade package software signature 216, in some embodiments, may comprise a combination of a hash value (e.g., an MD5 hash) of first upgrade package 200 and a hash value of second upgrade package 208. In some embodiments, second upgrade package software signature 216 may comprise an exclusive-or ("XOR") of a hash value (e.g., an MD5 hash) of first upgrade package 200 and a hash value of second upgrade package 208.

Second upgrade package signature 209 may also comprise boot loader unique ID 218. In some embodiments, boot loader unique ID 218 may comprise a hash (e.g., a 128-bit MD5 hash) of a boot loader for installation on electronic device 100. Second upgrade package signature 209 also comprises boot loader version 220, which in some embodiments may represent a version number associated with the boot loader for installation on electronic device 100. Second upgrade package signature 209 also comprises boot loader size 222 representing the size (e.g., in bytes) of the boot loader intended for installation on electronic device 100. Second upgrade package signature 209 may also comprise boot loader start block 224 and boot loader end block 226. Start block 224 and end block 226 may represent, for example, the particular sectors or blocks on a storage device, such as persistent storage 107, where boot loader 211 is intended for storage. Electronic device can use this information to install boot loader 211 on persistent storage 107 and to back up currently installed boot loader 105.

Second upgrade package signature 209 may also comprise OS Unique ID 228. In some embodiments, OS unique ID 228 comprises a hash (e.g., a 128-bit MD5 hash) of new OS 213. Second upgrade package signature 209 may also comprises OS version 230, which in some embodiments represents a version number associated with new OS 213. Second upgrade package signature 209 may also comprise OS size 232, representing the size (e.g., in bytes) of new OS 213. Second upgrade package signature 209 may also comprise OS start block 234 and OS end block 236. Start block 234 and end block 236 may represent, for example, the particular sectors or blocks on a storage device, such as persistent storage 107 where new OS 213 is intended for storage.

Second upgrade package signature 209 may also comprise Boot Loader Checksum 238. In some embodiments, boot loader checksum 238 may comprise a CRC (Cyclic Redundancy Check) value computed over new boot loader 211. Second upgrade package signature 209 may also comprise OS Checksum 240. In some embodiments, OS checksum 240 may comprise a CRC value computed over new OS 213.

Second upgrade package 208, in some embodiments, may also be usable to install a new operating system, such as new OS 213. As explained above, in some embodiments, second upgrade package 208 may comprise new OS 213. In these embodiments, second upgrade package signature 209 may comprise the above-mentioned data elements 228-236 and 240. In other embodiments, second upgrade package 208 may not comprise OS 213 (for example, if only new boot loader 211 is to be loaded on electronic device 100). In these embodiments, second upgrade package signature 209 does not necessarily comprise data elements 228-236 and 240 (as they correspond to new OS 213).

Figure 3A:
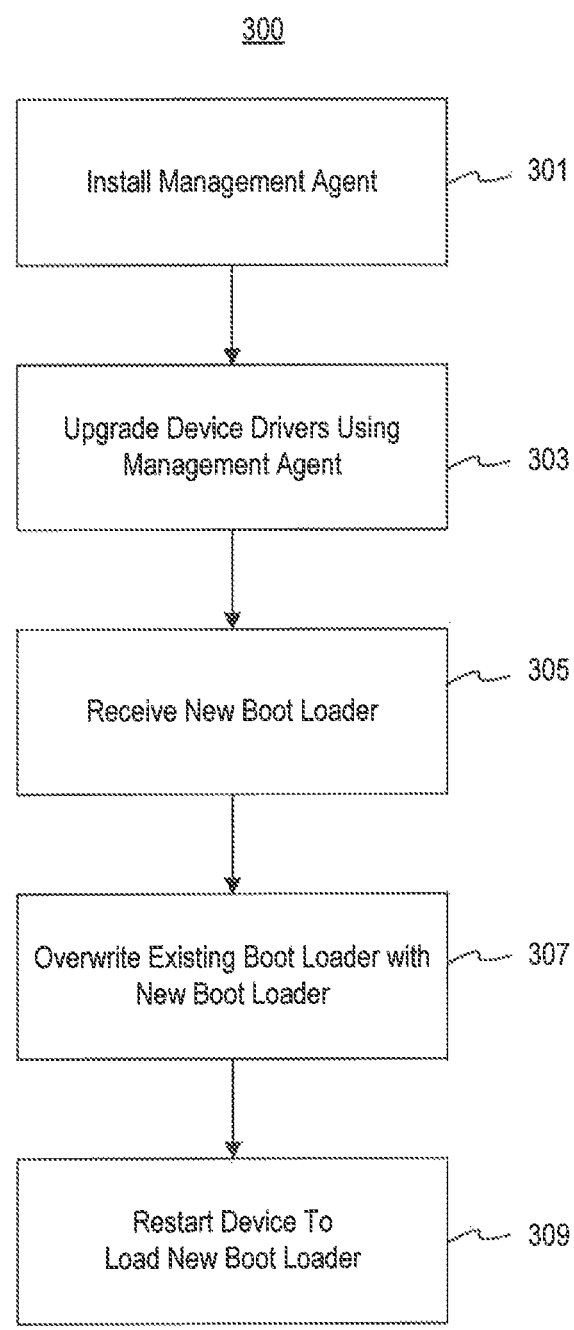
FIG. 3A illustrates an example method for writing a new boot loader to an electronic device, consistent with the disclosed embodiments.

FIG. 3A illustrates an exemplary method 300 for writing a new boot loader to electronic device 100, consistent with the disclosed embodiments. In some embodiments, method 300 occurs at least partially while an existing OS (e.g., OS 101) is running. In step 301, electronic device 100 installs a management agent, such as management agent 111 (from FIG. 1). In some embodiments, the installation of management agent 111 may have occurred before a user receives and/or uses electronic device 100. In other embodiments, management agent 111 may be received as part of an upgrade package received from external system 102, such as first upgrade package 200. One of ordinary skill will understand that there may be other ways to receive management agent for installation on electronic device 100. In some embodiments, the installation of management agent 111 may be instantiated by a user.

In step 303, management agent 111 installs an upgrade to device drivers 109 on electronic device 100. In some embodiments, electronic device 100 may receive management agent 111 and data for upgrading device drivers 109 as part of first upgrade package 200 (for example, as upgrade data 203), and management agent 111 may install the upgraded device drivers 109 upon receipt.

The upgraded device drivers 109, in some embodiments, may enable a connection between management agent 111 and device drivers 109. The connection may be a direct connection in that each of management agent 111 and device drivers 109 may communicate with one another without needing to communicate through another medium (e.g., OS 101). This connection with device drivers 109 may enable management agent 111 to communicate with a persistent storage device, such as persistent storage device 107, enabling management agent 111 to read data from and to write data to (also known as "flashing" data) persistent storage device 107.

In step 305, electronic device 100 may receive a new boot loader for installation. As explained above, a new boot loader can be delivered to electronic device 100 as part of second upgrade package 208. It is to be understood, however, that a new boot loader can be delivered to electronic device 100 through other means.

In step 307, management agent 111 may provide instructions to device drivers 109 to overwrite a boot loader present in persistent storage 107. In some embodiments, the instructions may include data from second upgrade package signature 209, such as boot loader size 222, boot loader start block 224, or boot loader end block 226, enabling device drivers 109 to determine where on persistent storage 107 to install the new boot loader.

In step 309, management agent 111 causes electronic device 100 to restart. This has the effect of causing electronic device 100 to read the new overwritten boot loader from persistent storage and load it into memory. The new boot loader can be used to boot a new operating system or perform other tasks.

Figure 3B:
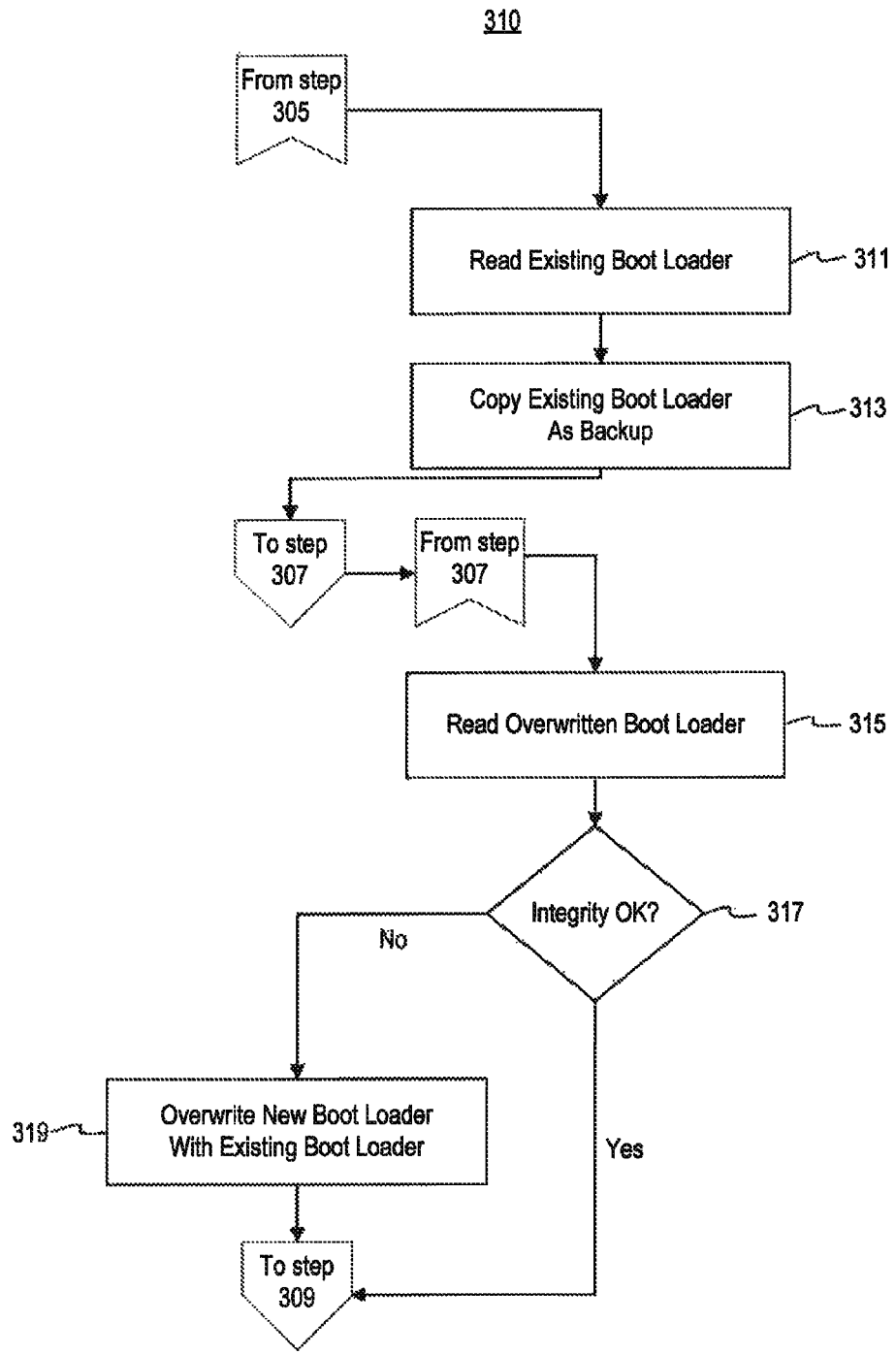
FIG. 3B illustrates an example method for enabling "rollback" of an existing boot loader on an electronic device, consistent with the disclosed embodiments.

FIG. 3B illustrates an exemplary method 310 for enabling "rollback" of an existing boot loader on electronic device 100, consistent with the disclosed embodiments. Method 310 comprises steps that, in some embodiments, may occur substantially simultaneously with the steps described above with respect to FIG. 3A.

As explained above with respect to FIG. 3A, upon electronic device 100 receiving a new boot loader, method 310 may continue to step 311. In step 311, management agent 111 may provide instructions to device drivers 109 to read boot loader 105 from persistent storage 107. In some embodiments, management agent 111 may provide at least one of a beginning block, an end block, and/or a size, to enable device drivers 109 to read only the portion of persistent storage 107 that contains the existing boot loader.

In step 313, management agent 111 may provide instructions to device drivers 109 to generate a backup copy of the existing boot loader 105 in persistent storage 107. In some embodiments, device drivers 109 may copy the backup of the existing boot loader to a different portion of persistent storage 107, to a different storage device, to a remote device over a network, or the like. The process may then continue to step 307 in FIG. 3A.

In step 307, management agent 111 may provide instructions to device drivers 109 to overwrite a boot loader present in persistent storage 107. At step 315, management agent 111 may provide instructions to read the new boot loader from persistent storage 107. In step 317, management agent 111 may provide instructions to device drivers 109 to check the integrity of the new boot loader persistent storage 107. This is done, for example, to ensure that electronic device 100 will not be rendered inoperable due to a faulty boot loader on persistent storage 107 or the like. The integrity check in step 317 comprises, for example, determining whether a checksum of the written boot loader is equal to a received checksum, such as boot loader checksum 238 in second upgrade package signature 208.

If the integrity of the new boot loader is correct, method 310 may continue to step 309, which, as explained above, causes electronic device 100 to restart, causing the new boot loader to be loaded into memory. But if management agent 111 instead determines that the integrity of the new boot loader is inconsistent or otherwise encounters an error in the new boot loader, method 310 may continue to step 319. In step 319, management agent 111 may provide instructions to device drivers 109 to overwrite the new boot loader with the backup boot loader (e.g., the boot loader that was backed up in step 313). The method may then continue to step 309, where electronic device 100 is rebooted and the existing boot loader is loaded.

Figure 4A:
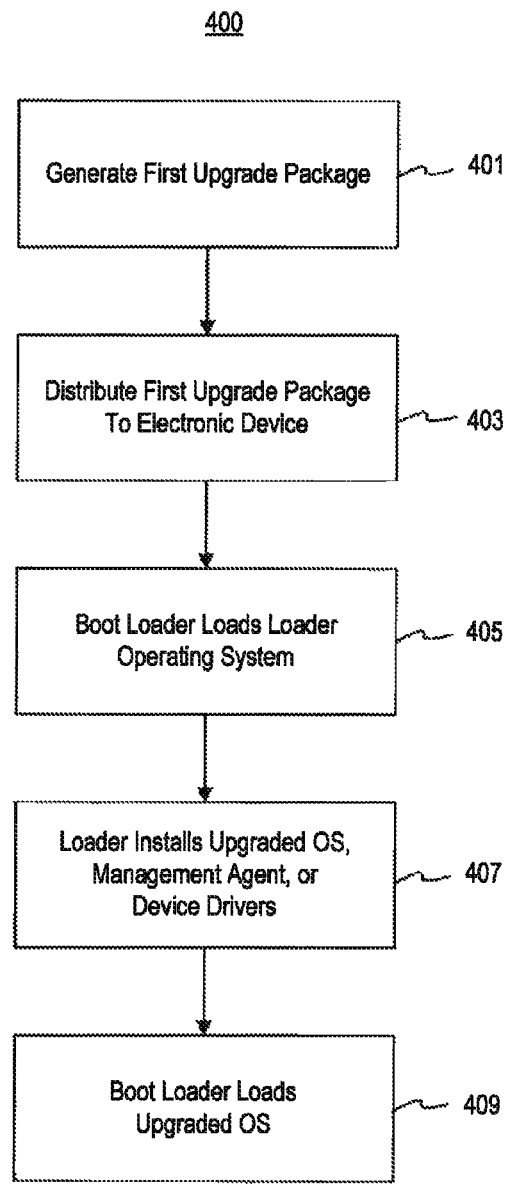
FIG. 4A illustrates a first method for enabling an electronic device to receive and install a new boot loader, consistent with the disclosed embodiments.

FIG. 4A illustrates an exemplary first method 400 for enabling electronic device 100 to receive and install a new boot loader, consistent with the disclosed embodiments. Method 400, along with method 402 in FIG. 4B, can be used to upgrade electronic device 100, enabling electronic device 100 to be upgraded to a different operating system than the one currently installed on electronic device 100.

In step 401, a device (e.g., electronic device 100) may generate a first upgrade package, for example, first upgrade package 200. In step 403, electronic device 100 may receive first upgrade package 200. First upgrade package 200 may be delivered to electronic device 100 through a variety of means. For example, electronic device 100 may receive first upgrade package 200 over a network (e.g., a wireless or wired network), over a connection with a device such as external device 102 (e.g., a USB connection), or from a storage device (such as a memory card). Electronic device 100 may store first upgrade package 200 on persistent storage 107.

In step 405, boot loader 105 may load a loader operating system, such as loader 103. For example, loader 103 may comprise an operating system or other functionality that enables new information to be loaded from persistent storage 107 and executed on electronic device 100.

In step 407, loader 103 may install at least one of an upgraded OS included in first upgrade package 200, upgraded device drivers included in first upgrade package 200, or a management agent included in first upgrade package 200. In some embodiments, step 407 may comprise installing an upgraded version of the operating system already installed on electronic device 100 (e.g., OS 101). The upgraded version of that operating system differs, for example, in that it allows for installation of management agent 111.

In step 409, the electronic device 100 may reboot and boot loader 105 may load the upgraded OS loaded by loader 103. The process may then continue in FIG. 4B.

Figure 4B:
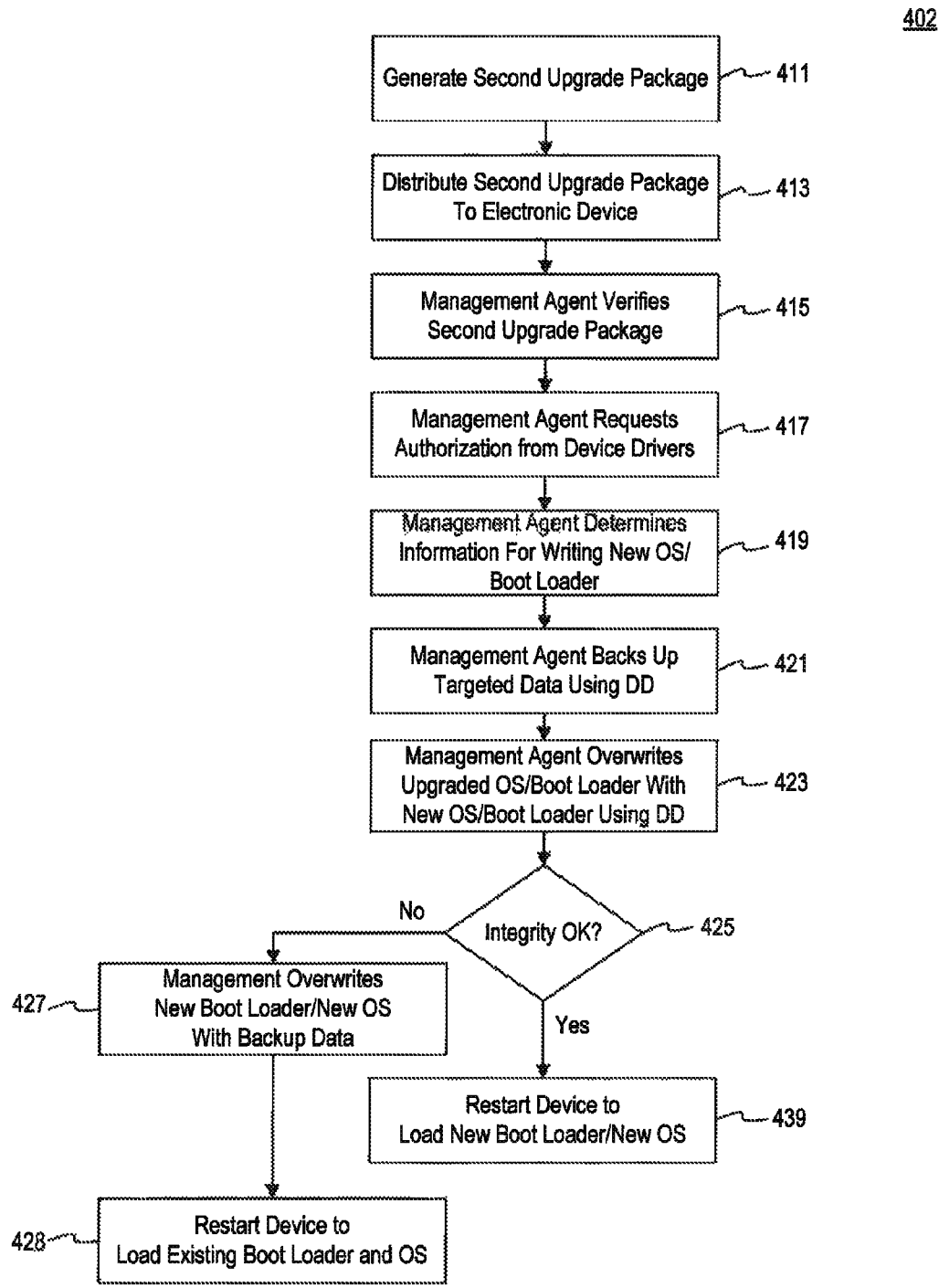
FIG. 4B illustrates a second method for enabling an electronic device to receive and install a new operating system, consistent with the disclosed embodiments.

FIG. 4B illustrates an exemplary second method 402 for enabling electronic device 100 to receive and install a new operating system, consistent with the disclosed embodiments. In some embodiments, when method 402 begins, the processes in FIG. 4A have already taken place. In other embodiments, the particular processes in FIG. 4A may not have taken place.

In step 411, a system (e.g., external device 102) may generate a second upgrade package, such as second upgrade package 208 in FIG. 2B. New OS 213 included in second upgrade package 208 may be a different type of OS currently installed on electronic device 100. For example, OS 101 installed on electronic device 100 may be Wind River Systems' VxWorks, while new OS 213 may be a type of Linux or Microsoft's Windows Embedded Compact. Second upgrade package 208 may also comprise new boot loader 211. In some embodiments, boot loader 211 may be associated with the OS included in second upgrade package 208, while boot loader 105 installed on electronic device 100 may be associated with the currently installed OS 101. Boot loader 105 installed on electronic device 100 may be configured to only load OS 101. Thus, in order to enable the new OS included in second upgrade package 208 to operate, boot loader 211 may be configured to load new OS 213. In other embodiments, as explained above, second upgrade package 208 may omit new OS 213

In step 413, electronic device 100 may receive second upgrade package 208. Second upgrade package 208 may be delivered to electronic device 100 through a variety of means. For example, electronic device 100 may receive second upgrade package 208 over a network (e.g., a wireless or wired network), over a connection with a device such as external device 102 (e.g., a USB connection), or from a storage device (such as a memory card). Electronic device 100 may store second upgrade package 208 on persistent storage 107.

In step 415, management agent 111 may verify second upgrade package 208. Verification of second upgrade package 208 may comprise, for example comparing data in second upgrade package 208 with corresponding data in first upgrade package 200. For example, management agent 111 may compare OEM ID 210 and platform ID 212 from second upgrade package 208 to OEM ID 202 and platform ID 204 from first upgrade package 200. Management agent 111 may also extract second upgrade package software signature 216 from second upgrade package 208 and perform an exclusive-or ("XOR") with upgrade package software signature 206 from first upgrade package 200 to generate a possible hash value for second upgrade package 208. Management agent 111 may then compute an MD5 hash of second upgrade package 208 and compare that computed MD5 hash to the possible hash value for second upgrade package 208. If the two are equal, then the second package is verified and the process may continue to step 417.

Figure 5:
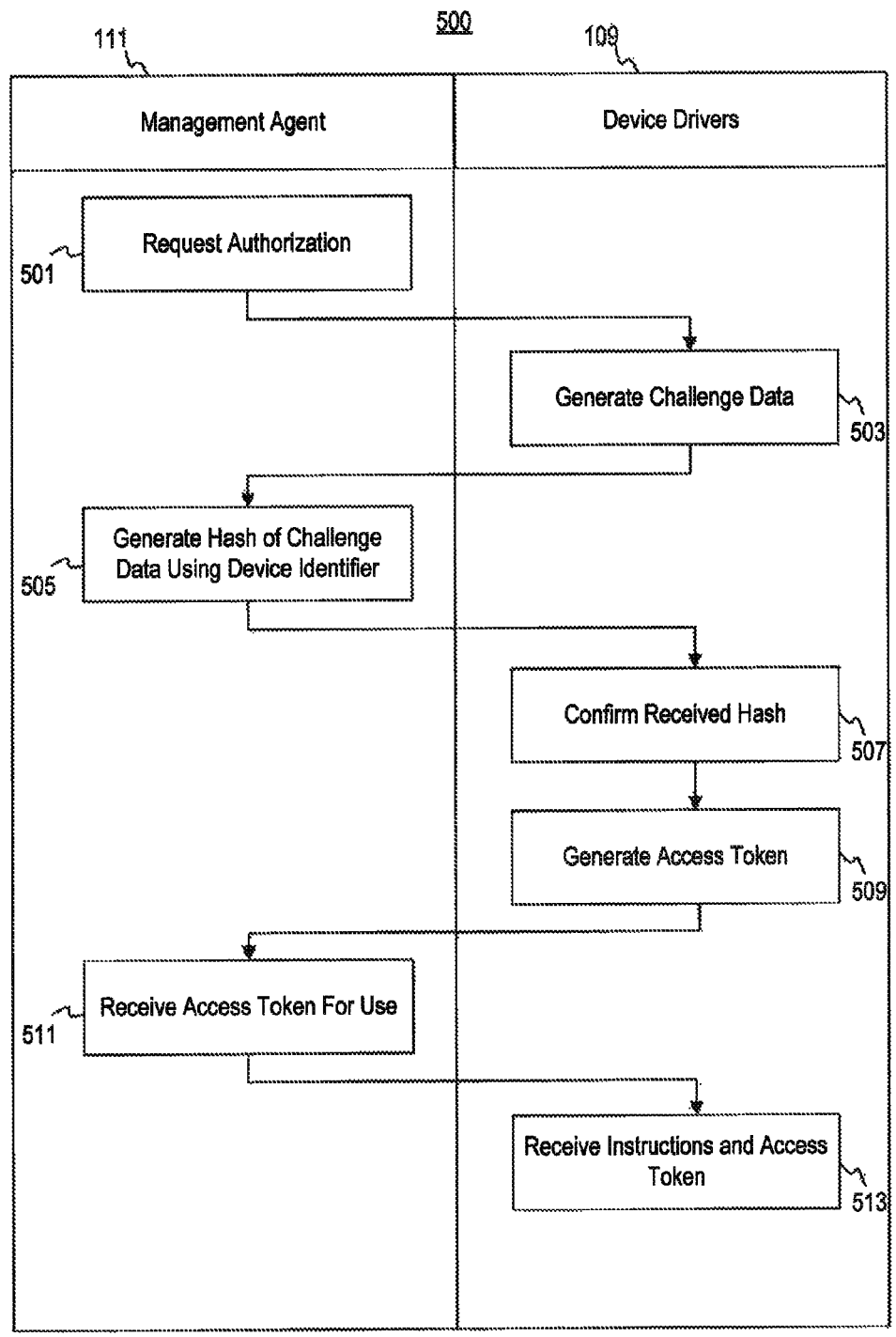
FIG. 5 illustrates an example handshaking method between a management agent and device drivers on an electronic device, consistent with the disclosed embodiments.

In step 417, management agent 111 may request authorization from device drivers 109 to interact with persistent storage 107. An exemplary process for requesting and receiving such authorization is depicted in FIG. 5, described below. One of ordinary skill will understand that other embodiments for requesting such authorization are possible as well.

In step 419, management agent 111 may determine information necessary for writing new boot loader 211 and/or new OS 213 to persistent storage 107. Such information may include boot loader size 222, boot loader start block 224, boot loader end block 226, OS size 232, OS start block 234, and/or OS end block 236. These elements, in some embodiments, may be obtained by management agent 111 from second upgrade package signature 209.

In step 421, management agent 111 may provide instructions to device drivers 109 to read boot loader 105 from persistent storage 107 based on the information determined in step 419. In some embodiments, management agent 111 may provide at least one of a beginning block, an end block, and/or a size to enable device drivers 109 to read only the portion of persistent storage 107 that contains the existing boot loader. Management agent 111 may also provide instructions to device drivers 109 to make a backup copy of existing boot loader 105 in persistent storage 107. In some embodiments, device drivers 109 may copy the backup of the existing boot loader to a different portion of persistent storage 107, to a different storage device, to a remote device over a network, or the like.

In step 423, management agent 111 may provide instructions to device drivers 109 to overwrite boot loader 105 and/or OS 101 present in persistent storage 107 with new boot loader 211 and/or new OS 213. In some embodiments, the instructions may include data from second upgrade package signature 209, such as boot loader size 222, boot loader start block 224, boot loader end block 226, OS size 232, OS start block 234, or OS end block 236, enabling device drivers 109 to determine where on persistent storage 107 to install the new boot loader.

In step 425, management agent 111 provides instructions to device drivers 109 to check the integrity of the installed new boot loader 211 and/or new OS 213. The integrity check in step 317 comprises, for example, determining whether a checksum of the written boot loader is equal to a received checksum, such as boot loader checksum 238 and/or OS checksum 240 in second upgrade package signature 208.

If the integrity of the written boot loader and/or OS is proper, method 402 may continue to step 439, which causes electronic device 100 to restart, causing new boot loader 211 and/or new OS 213 to be loaded into memory and booted. But if management agent 111 determines that the integrity of the new boot loader or new OS is inconsistent or otherwise encounters an error in the new boot loader, method 402 may continue to step 427. In step 427, management agent 111 may provide instructions to device drivers 109 to overwrite new boot loader 213 with the backed up boot loader 105 and new OS 213 with backed up OS 101. The method may then continue to step 428 where electronic device 100 is rebooted and the existing boot loader 105 and OS 101 are loaded.

FIG. 5 illustrates an example handshaking method 500 between a management agent 111 and device drivers 109 on electronic device 100, consistent with disclosed embodiments. Method 500 may enable management agent 111 to request authorization from device drivers 109. The authorization may be received, for example, by management agent 111 in the form of an access token which enables management agent 111 to provide instructions to device drivers 109.

In step 501, management agent 111 may generate a request for an access token and sends it to device drivers 109. In step 103, device drivers 109 may receive the request for an access token. In response, device drivers 109 may generate random challenge data, for example, a unique random number or string of data. Device drivers 109 may send the random challenge data to management agent 111.

Management agent 111 may receive the random challenge data in step 505. Management agent 111 may then generate a keyed hash value or Message Authentication Code (e.g., HMAC-MD5) over that random challenge data. The hash value, in some embodiments, may use a unique identifier associated with electronic device 100 as a key. For example, the key used in step 505 may be platform ID 204. Management agent 111 may send the generated keyed hash to device drivers 109.

In step 507, device drivers 109 may confirm the hash generated by management agent 111. For example, device drivers 109 may generate its own copy of the keyed hash value, based on its access to the random challenge data and the unique identifier used as the key. If there is a match between the generated keyed hash value and the received keyed hash value, the process may continue to step 509. In step 509, device drivers 109 may generate an access token that authorizes management agent 111 to deliver instructions and communicate with persistent storage 107 through device drivers 109. In some embodiments, the generated access token may comprise or may be associated with a timestamp or some expiration condition (such as "no more than 3 uses"). Device drivers 109 may then send the access token to management agent 111.

In step 511, management agent 111 may send the access token along with instructions to device drivers 109. The instructions may comprise, for example, instructions for device drivers 109 to read an operating system from persistent storage 107 or to overwrite an existing boot loader on persistent storage 107 with a new boot loader. In step 513, device drivers 109 may receive the access token and instructions. If the access token is valid (e.g., has not expired, is not being misused, and/or matches a validly-created access token), device drivers 109 may validate the token and processes the received instructions.

Figure 6:
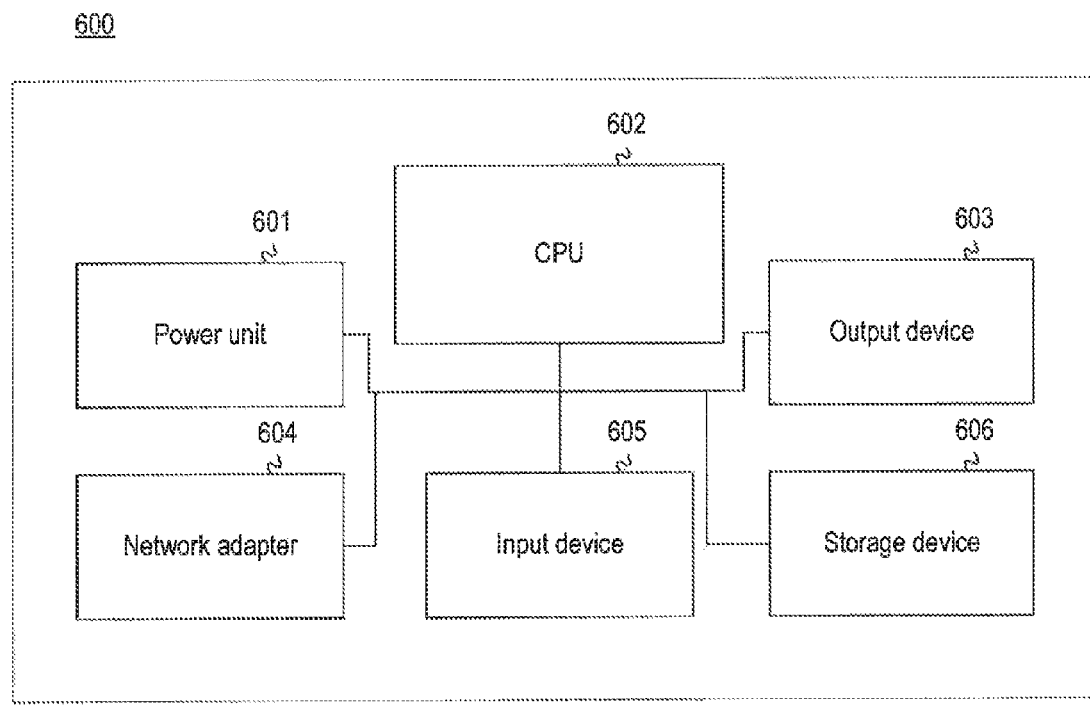
FIG. 6 illustrates an example computing device, consistent with the disclosed embodiments.

FIG. 6 illustrates an exemplary computing device 600, consistent with the disclosed embodiments. Each component depicted in these figures (e.g., electronic device 100 or external device 102) may be implemented as illustrated in device 600. In some embodiments, the components in FIG. 6 may be duplicated, substituted, or omitted. In some embodiments, device 600 can be implemented, as appropriate, as a mobile device, a personal computer, a server, a mainframe, a web server, a wireless device, a GPS System, an in-vehicle infotainment system, or any other system that includes at least some of the components of FIG. 6. Each of the components in FIG. 6 can be connected to one another using, for example, a wired interconnection system such as a bus.

Device 600 may comprise power unit 601. Power unit 601 can be implemented as a battery, a power supply, or the like. Power unit 601 provides the electricity necessary to power the other components in device 600. For example, CPU 602 needs power to operate. Power unit 601 can provide the necessary electric current to power this component.

Device 600 may contain a Central Processing Unit (CPU) 602, which enables data to flow between the other components and manages the operation of the other components in computer device 600. CPU 602, in some embodiments, can be implemented as a general-purpose hardware processor (such as an Intel- or AMD-branded processor), a special-purpose hardware processor (for example, a graphics-card processor or a mobile processor), or any other kind of hardware processor that enables the input, output, and/or execution of data.

Device 600 may also comprise output device 603. Output device 603 can be implemented as a monitor, printer, speaker, plotter, or any other device that presents data processed, received, and/or sent by computer device 600.

Device 600 may also comprise network adapter 604. Network adapter 604, in some embodiments, may enable communication with other devices that are implemented in the same or similar way as computer device 600. Network adapter 604, in some embodiments, may allow communication to and/or from a network such as the Internet. Network adapter 604 may be implemented using any known or as-yet-unknown wired or wireless technologies, such as Ethernet, 802.11a/b/g/n (aka Wi-Fi), cellular (e.g. GSM, CDMA, LTE), or the like.

Device 600 may also comprise input device 605. In some embodiments, input device 605 may be any device that enables a user to input data. For example, input device 605 could be a one or more of a keyboard, a mouse, or the like. Input device 605 can be used to control the operation of the other components illustrated in FIG. 6.

Device 600 also includes storage device 606. Storage device 606 may store data that is usable by the other components in device 600. Storage device 606 may, in some embodiments, be implemented as a hard drive, temporary memory (e.g., RAM for loading of programs/data), permanent memory (e.g., solid state storage for storing programs/data for future use), optical memory, or any other type of permanent or temporary storage device. Storage device 606 may store one or more modules of computer program instructions and/or code that creates an execution environment for the computer program in question, such as, for example, processor firmware, a protocol stack, a database management system, an operating system, or a combination thereof.

The term "processor system," as used herein, refers to one or more processors (such as CPU 602). The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described; however, other embodiments are within the scope of the following claims. Specifically, other embodiments will be apparent to those skilled in the art from consideration of the specification and practice of the disclosed embodiments. Thus, it is intended that the specification and examples be considered as exemplary only, with a true scope and spirit of the embodiments being indicated by the following claims.

What is claimed is:

1. A method of upgrading an electronic device, the method comprising:
    providing a management agent on the electronic device for communicating with one or more device drivers associated with the electronic device;
    upgrading the one or more device drivers to enable a direct connection between the management agent and the one or more device drivers, such that the management agent and the upgraded one or more device drivers communicate with one another without needing to communicate through another medium, the direct connection enabling the management agent to access persistent storage associated with the electronic device through the one or more device drivers;
    providing a new boot loader to the management agent; and
    overwriting, by the management agent, an existing boot loader stored in the persistent storage with the new boot loader, through the one or more device drivers.

2. The method of claim 1, wherein the new boot loader and the existing boot loader differ from one another in at least one of a version designation for underlying source code or an associated operating system (OS).

3. The method of claim 1, wherein overwriting the existing boot loader occurs while an existing OS is executing.

4. The method of claim 1, further comprising overwriting an existing OS in the persistent storage with a new OS.

5. The method of claim 4, wherein the new OS is associated with the new boot loader and the existing OS is associated with the existing boot loader; and the new OS and the existing OS differ from one another in at least one of a version designation for underlying source code or type of OS.

6. The method of claim 1, wherein providing the new boot loader further comprises providing a checksum associated with the new boot loader, and wherein the method further comprises:
    before overwriting the existing boot loader with the new boot loader:
    reading, by the management agent, data corresponding to the existing boot loader; and
    copying data representing the existing boot loader into a portion of the persistent storage; and
    after overwriting the existing boot loader with the new boot loader:
    calculating a checksum of the written boot loader;
    determining whether the provided checksum matches the calculated checksum; and
    based on the determination, overwriting the new boot loader with the copied data representing the existing boot loader.

7. The method of claim 1, wherein the management agent is installed by a user of the electronic device.

8. The method of claim 1, wherein:
    providing the management agent further comprises providing a first signature comprising a hash of the existing boot loader, a manufacturer identifier, and a device identifier;
    providing the new boot loader further comprises providing a second signature comprising a hash of the existing boot loader, a hash of the new boot loader, a manufacturer identifier, and a device identifier, and wherein the method further comprises verifying the new boot loader based on the first signature.

9. The method of claim 1, wherein overwriting the existing boot loader further comprises performing a handshake process between the management agent and the one or more device drivers, the handshake process comprising:
    requesting, by the management agent, an access token;
    receiving, from the one or more device drivers, challenge data;
    generating a hash of the challenge data based on an identifier associated with the electronic device; sending the hash to the one or more device drivers;
    receiving an access token for instructing the one or more device drivers; and
    sending, to the one or more device drivers, the received access token and instructions to overwrite the existing boot loader.

10. The method of claim 1, wherein overwriting the existing boot loader further comprises writing directly to the persistent storage without accessing a file system associated with the persistent storage.

11. An electronic device comprising:
at least one electronic processor;
at least one storage device comprising instructions, the instructions configured to cause the at least one electronic processor to perform a method comprising:
providing a management agent on the electronic device for communicating with one or more device drivers associated with the electronic device;
upgrading the one or more device drivers to enable a direct connection between the management agent and the one or more device drivers, such that the management agent and the upgraded one or more device drivers communicate with one another without needing to communicate through another medium, the direct connection enabling the management agent to access persistent storage associated with the electronic device through the one or more device drivers; providing a new boot loader to the management agent; and
overwriting, by the management agent, an existing boot loader stored in the persistent storage with the new boot loader, through the one or more device drivers.

12. The device of claim 11, wherein the new boot loader and the existing boot loader differ from one another in at least one of a version designation for underlying source code or an associated operating system (OS).

13. The device of claim 11, wherein overwriting the existing boot loader occurs while an existing OS is executing.

14. The device of claim 11, wherein the instructions are further configured to cause the at least one electronic processor to overwrite an existing OS in the persistent storage with a new OS.

15. The device of claim 14, wherein the new OS is associated with the new boot loader and the existing OS is associated with the existing boot loader; and the new OS and the existing OS differ from one another in at least one of a version designation for underlying source code or type of OS.

16. The device of claim 11, wherein providing the new boot loader further comprises providing a checksum associated with the new boot loader, and wherein the instructions are further configured to cause the at least one electronic processor to perform a method comprising:
before overwriting the existing boot loader with the new boot loader: reading, by the management agent, data corresponding to the existing boot loader; and
copying data representing the existing boot loader into a portion of the persistent storage; and
after overwriting the existing boot loader with the new boot loader: calculating a checksum of the written new boot loader;
determining whether the provided checksum matches the calculated checksum; and
based on the determination, overwriting the new boot loader with the copied data representing the existing boot loader.

17. The device of claim 11, wherein the management agent is installed by a user of the electronic device.

18. The device of claim 11, wherein:
providing the management agent further comprises providing a first signature comprising a hash of the existing boot loader, a manufacturer identifier, and a device identifier;
providing the new boot loader further comprises providing a second signature comprising a hash of the existing boot loader, a hash of the new boot loader, a manufacturer identifier, and a device identifier, and wherein the instructions are further configured to cause the at least one electronic processor to verify the new boot loader based on the first signature.

19. The device of claim 11, wherein overwriting the existing boot loader further comprises performing a handshake process between the management agent and the one or more device drivers, the handshake process comprising:
requesting, by the management agent, an access token;
receiving, from the one or more device drivers, challenge data;
generating a hash of the challenge data based on an identifier associated with the electronic device; sending the hash to the one or more device drivers;
receiving an access token for instructing the one or more device drivers; and
sending, to the one or more device drivers, the received access token and instructions to overwrite the existing boot loader.

20. The device of claim 11, wherein overwriting the existing boot loader further comprises writing directly to the persistent storage without accessing a file system associated with the persistent storage.

* * * * *